United States Patent
Peng

(10) Patent No.: US 8,261,349 B2
(45) Date of Patent: Sep. 4, 2012

(54) ROUTER FOR PREVENTING PORT SCANS AND METHOD UTILIZING THE SAME

(75) Inventor: Hua-Jui Peng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 363 days.

(21) Appl. No.: 12/698,218

(22) Filed: Feb. 2, 2010

(65) Prior Publication Data
US 2011/0067103 A1    Mar. 17, 2011

(30) Foreign Application Priority Data
Sep. 17, 2009   (CN) .......................... 2009 1 0307182

(51) Int. Cl.
*H04L 29/06* (2006.01)
(52) U.S. Cl. ............ 726/22; 726/23; 709/223; 709/224; 709/225
(58) Field of Classification Search .................. None
See application file for complete search history.

(56) References Cited

U.S. PATENT DOCUMENTS

| | | | |
|---|---|---|---|
| 6,957,348 B1 * | 10/2005 | Flowers et al. | 726/23 |
| 7,500,266 B1 * | 3/2009 | Vukelich et al. | 726/23 |
| 7,543,056 B2 * | 6/2009 | McClure et al. | 709/224 |
| 7,624,444 B2 * | 11/2009 | Gupta et al. | 726/23 |
| 7,664,855 B1 * | 2/2010 | Freed et al. | 709/225 |
| 7,962,957 B2 * | 6/2011 | Keohane et al. | 726/23 |
| 2002/0144156 A1 * | 10/2002 | Copeland, III | 713/201 |
| 2004/0117478 A1 * | 6/2004 | Triulzi et al. | 709/224 |
| 2009/0288157 A1 * | 11/2009 | Pacella et al. | 726/12 |

\* cited by examiner

*Primary Examiner* — Ponnoreay Pich
(74) *Attorney, Agent, or Firm* — Altis Law Group, Inc.

(57) ABSTRACT

A router and method for preventing port scans using a router includes receiving a datagram from a remote computer, transferring the datagram to a local computer, and receiving a response datagram from the local computer. The router and method further includes dropping the response datagram if the response datagram is an Internet Control Messages Protocol (ICMP) port unreachable datagram and the ICMP port unreachable datagram is abnormal, and recording a port scan event of the remote computer into the log system.

18 Claims, 3 Drawing Sheets

ROUTER FOR PREVENTING PORT SCANS AND METHOD UTILIZING THE SAME

BACKGROUND

1. Technical Field

Embodiments of the present disclosure relate to computer security, and more particularly, to a router and a method for preventing port scans using the router.

2. Description of Related Art

Hackers typically initiate a hack by performing port scans against the target computer (machine) to determine system information based on points of vulnerability which are then exploited. Port scanners systematically look for opened/unsecured ports and related applications of the target computer. In port scanning, a series of messages are sent for requesting a connection with each well-known port (entry point). The response received from the target computer indicates which entry point(s) is/are opened or closed, the object being to locate entry point(s) into the target computer for attack.

What is needed, therefore, is an improved router and method for preventing port scans using the router.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
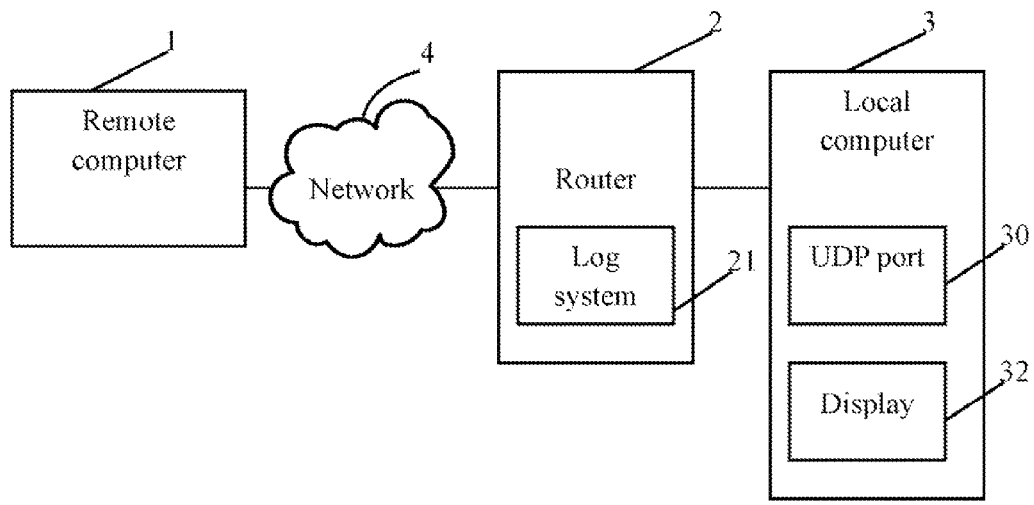
FIG. 1 is a block diagram of one embodiment of a router connected with a local computer.

FIG. 1 is a block diagram of one embodiment of a router 2 connected with a local computer 3. The local computer 3 may connect to a plurality of remote computers (only one is shown in FIG. 1) 1 through the router 2 and a network 4. The local computer 3 includes a user datagram protocol (UDP) port 30. The router 2 may be used to prevent port scan attacks by the remote computer 1 so as to protect the UDP port 30. In one embodiment, the remote computer 1 may scan the UDP port 30 by sending many packets (e.g., packet flooding) to the local computer 3. In another embodiment, the remote computer 1 may send packets including viruses to the local computer 3.

In one embodiment, the local computer 3 may be a local area network (LAN) server or a LAN station, and the remote computer 1 may be a wide area network (WAN) computer. The local computer may further include a display 32. The display 32 may display visible data. The remote computer 1 may use an asymmetrical digital subscriber loop (ADSL) modem or a cable modem of the remote computer 1 to connect to the router 2 through the network 4. The network 4 may be the Internet, or a communication network, for example. The local computer 3 may connect to the router 2 through an Intranet, for example.

The router 2 includes a log system 21. The log system 21 may be used to record various kinds of events occurred in the router 2 or the local computer 3. For example, the log system 21 records connection logs of the local computer 3 with the remote computer 1, and port scan events of the local computer 3.

Figure 2:
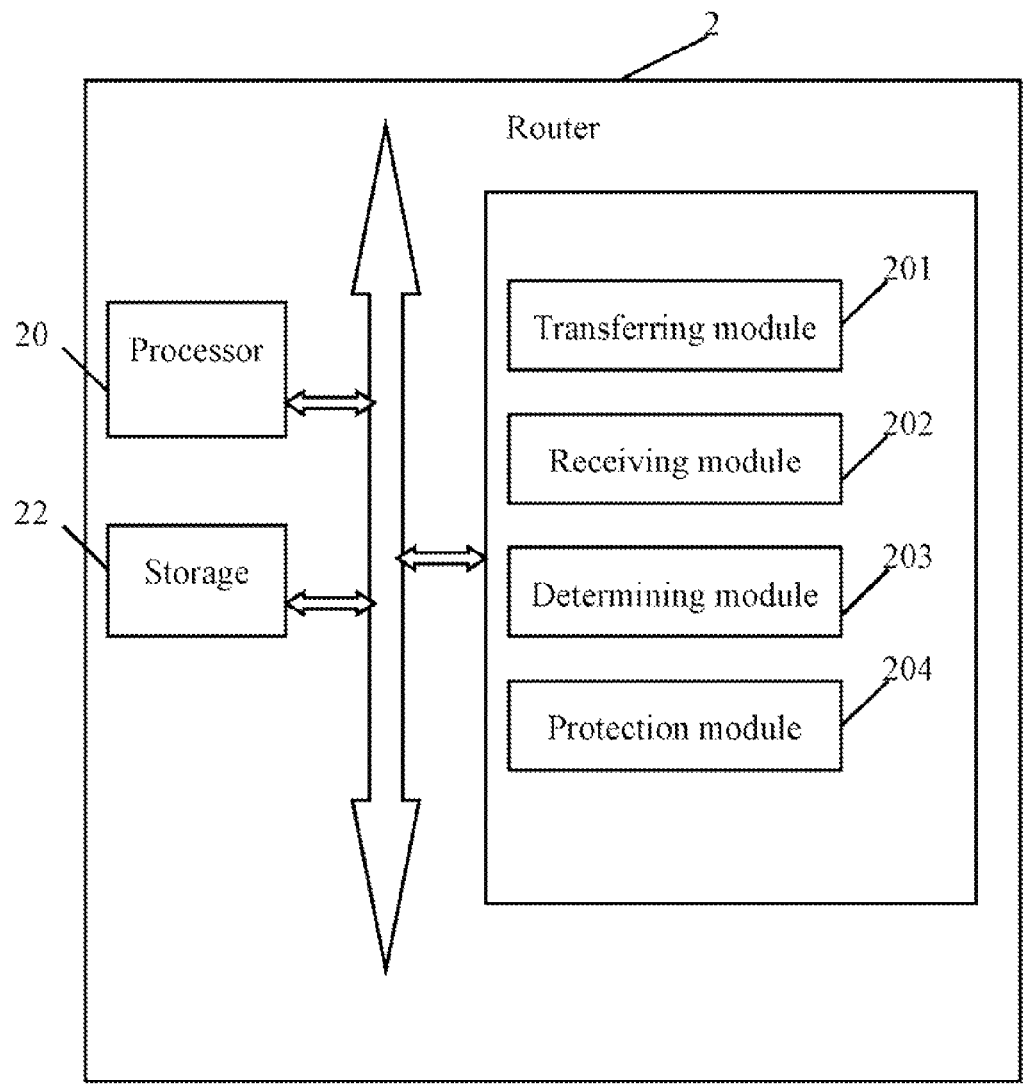
FIG. 2 is a block diagram of one embodiment of function modules of the router of FIG. 1.

FIG. 2 is a block diagram of one embodiment of function modules the router 2 of FIG. 1. The router 2 may include a processor 20 and a storage 22. The processor 20 executes one or more computerized operations of the router 2 and other applications, to provide functions of the router 2. The storage 22 stores various kinds of data, such as an operating system, applications, service data, and recorded information of the log stem 2, for example. In one embodiment, the storage 22 may be a memory of the router 2 or an external storage device, such as a memory stick, a smart media card, a compact flash card, or any other type of memory card.

In one embodiment, the router 2 may include a transferring module 201, a receiving module 202, a determining module 203, and a protection module 204. The modules 201-204 may comprise one or more computerized codes to be executed by the processor 20 to perform one or more operations of the router 2. Details of these operations will be provided below.

The transferring module 201 receives a datagram from a remote computer 1 through the network 4, and transfers the datagram to the local computer 3.

The local computer 3 receives the datagram through the UDP port 30, and then sends a response datagram to the router 2. The receiving module 202 receives the response datagram from the local computer 3.

The determining module 203 determines if the response datagram is an Internet Control Messages Protocol (ICMP) port unreachable datagram according to a datagram format of the response datagram. In one embodiment, if an ICMP type of the datagram is 3 and an ICMP code of the datagram is 3, the response datagram is determined to be the ICMP port unreachable datagram.

If the response datagram is not the ICMP port unreachable datagram, the transferring module 201 transfers the response datagram to the remote computer 1.

If the response datagram is the ICMP port unreachable datagram, the determining module 203 further determines if the ICMP port unreachable datagram is normal according to connection logs between the local computer 3 with the remote computer 1 using the log system 21. In one embodiment, if the log system 21 records a successful UDP connectivity between the local computer 3 and the remote computer 1, and datagrams have been exchanged using the successful UDP connectivity, the determining module determines that the ICMP port unreachable datagram is normal. In another embodiment, if the log system 21 records a successful UDP connectivity between the local computer 3 and the remote computer 1, and the ICMP port unreachable datagram is generated because the successful UDP connectivity is disconnected, the determining module also determines that the ICMP port unreachable datagram is normal.

Otherwise, if the log system 21 does not record any successful UDP connectivity between the remote computer 1 and the local computer 3, the determining module determines that the ICMP port unreachable datagram is abnormal.

Furthermore, in other examples, if the receiving module 202 receives multiple ICMP port unreachable datagrams in a preset time interval, and a number of the multiple ICMP port unreachable datagrams exceeds a preset number, the determining module 203 determines that the ICMP port unreachable datagram is abnormal. The determining module 203 may be operable to preset/define the preset number and preset time interval.

If the ICMP port unreachable datagram is normal, the protection module 204 drops the ICMP port unreachable datagram. Alternatively, if the ICMP port unreachable datagram is abnormal, the protection module 204 drops the ICMP port unreachable datagram, and records a port scan event of the remote computer 1 into the log system 21. Dropping the ICMP port unreachable datagram prevents the remote computer 1 from knowing the status of the UDP port 30 of the local computer 3 thereby avoiding port scan attacks from the former (e.g., the remote computer 1). The status of the UDP port 30 may include an open status, a closed status, and/or a filtered status, for example.

For added security, the protection module 204 may further display the recorded port scan event as an alert on the display 32 of the local computer 3 so that a user may view details thereof.

Figure 3:
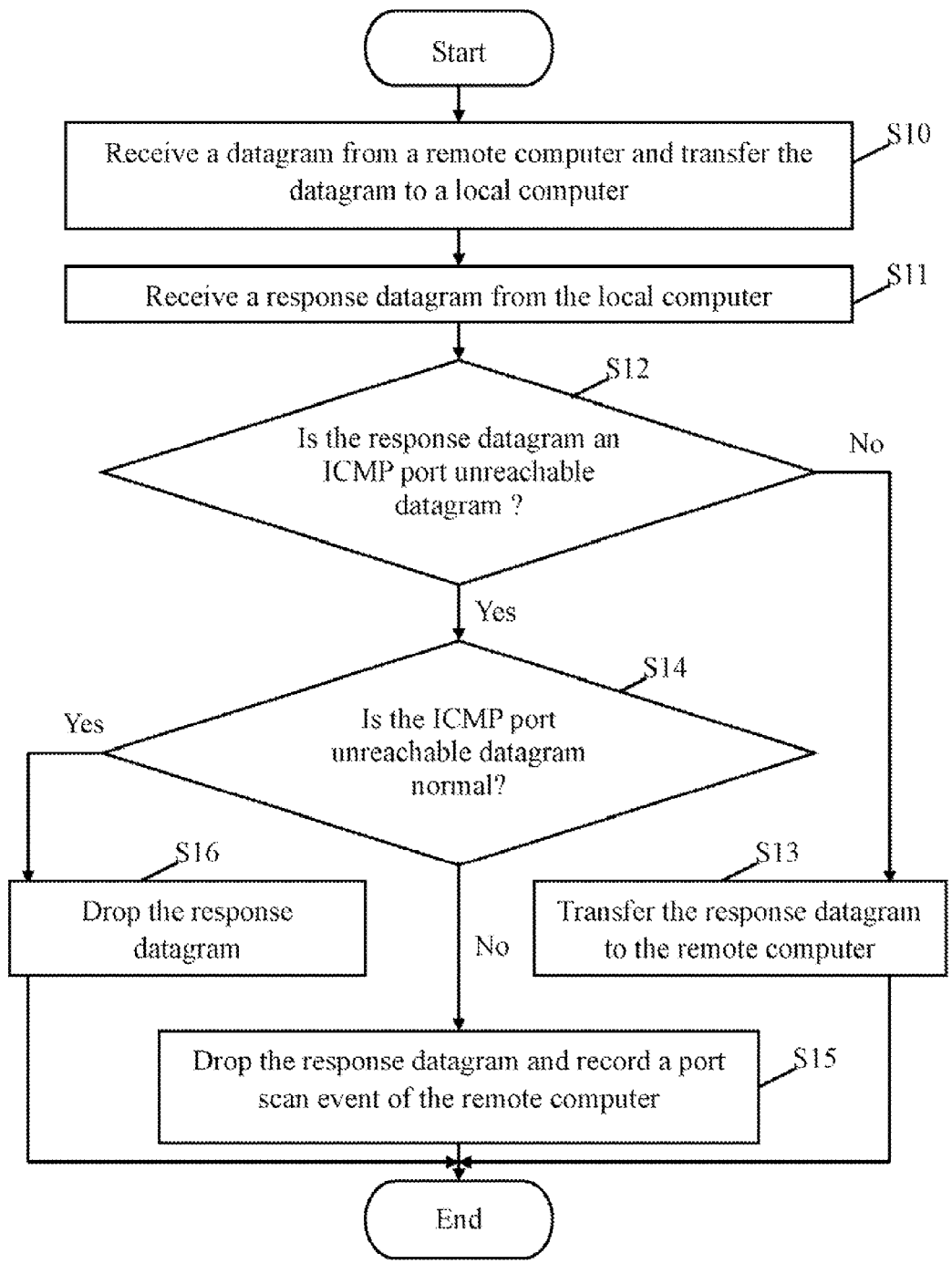
FIG. 3 is a flowchart of a first embodiment of a method for preventing port scans using the router of FIG. 1.

FIG. 3 is a flowchart of a first embodiment of a method for preventing port scans using the router 2 of FIG. 1. Depending on the embodiment, additional blocks may be added, others removed, and the ordering of the blocks may be replaced.

In block S10, the transferring module 201 receives a datagram from a remote computer 1 through the network 4, and transfers the datagram to the local computer 3. The local computer 3 receives the datagram through the UDP port 30, and then sends a response datagram to the router 2.

In block S11, the receiving module 202 receives the response datagram from the local computer 3.

In block S12, the determining module 203 determines if the response datagram is an Internet Control Messages Protocol (ICMP) port unreachable datagram according to a datagram format of the response datagram. As mentioned above, if an ICMP type of the datagram is 3 and an ICMP code of the datagram is 3, the response datagram is determined to be the ICMP port unreachable datagram.

If the response datagram is not the ICMP port unreachable datagram, in block S13, the transferring module 201 transfers the response datagram to the remote computer 1.

If the response datagram is the ICMP port unreachable datagram, in block S14, the determining module 203 determines if the ICMP port unreachable datagram is normal according to connection logs between the local computer 3 with the remote computer 1 using the log system 21.

As mentioned above, if the log system 21 records a successful UDP connectivity between the local computer 3 and the remote computer 1, and datagrams have been exchanged using the successful UDP connectivity, the determining module determines that the ICMP port unreachable datagram is normal. In another embodiment, if the log system 21 records a successful UDP connectivity between the local computer 3 and the remote computer 1, and the ICMP port unreachable datagram is generated because the successful UDP connectivity is disconnected, the determining module also determines that the ICMP port unreachable datagram is normal.

Otherwise, if the log system 21 does not record any successful UDP connectivity between the remote computer 1 and the local computer 3, the determining module determines that the ICMP port unreachable datagram is abnormal.

If the ICMP port unreachable datagram is abnormal, in block S15, the protection module 204 drops the ICMP port unreachable datagram, and records a port scan event of the remote computer 1 into the log system 21.

If the ICMP port unreachable datagram is normal, in block S16, the protection module 204 drops the ICMP port unreachable datagram.

Dropping the ICMP port unreachable datagram prevents the remote computer 1 from knowing the status of the UDP port 30 of the local computer 3, thereby avoiding port scan attacks from the former.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for preventing port scans using a router, the router being connected with a local computer, the router providing a log system to record connection logs of the local computer, the local computer comprising a user datagram protocol (UDP) port, the method comprising:
   receiving a datagram from a remote computer by the router, and transferring the datagram to the local computer;
   receiving a response datagram from the local computer;
   determining if the response datagram is an Internet Control Messages Protocol (ICMP) port unreachable datagram according to a datagram format of the response datagram;
   determining if the ICMP port unreachable datagram is normal according to connection logs between the local computer with the remote computer using the log system, if the response datagram is the ICMP port unreachable datagram; and
   dropping the ICMP port unreachable datagram if the ICMP port unreachable datagram is abnormal, and recording a port scan event of the remote computer into the log system.

2. The method according to claim 1, further comprising:
   transferring the response datagram to the remote computer if the response datagram is not the ICMP port unreachable datagram.

3. The method according to claim 1, further comprising:
   dropping the ICMP port unreachable datagram if the ICMP port unreachable datagram is normal.

4. The method according to claim 1, further comprising:
   displaying the recorded port scan event on a display of the local computer.

5. The method according to claim 1, wherein the response datagram is determined to be the ICMP port unreachable datagram if an ICMP type of the datagram is 3 and an ICMP code of the datagram is 3.

6. The method according to claim 1, wherein the local computer is a local area network (LAN) server or a LAN station.

7. A router, the router being connected with a local computer, the local computer comprising a user datagram protocol (UDP) port, the router comprising:
   a storage;
   a log system to record connection logs of the local computer;
   at least one processor; and
   one or more programs stored in the storage and being executable by the at least one processor, the one or more programs comprising:

a transferring module operable to receive a datagram from a remote computer, and transfer the datagram to the local computer;

a receiving module operable to receive a response datagram from the local computer;

a determining module operable to determine if the response datagram is an Internet Control Messages Protocol (ICMP) port unreachable datagram according to a datagram format of the response datagram, and determine whether the ICMP port unreachable datagram is normal according to connection logs between the local computer with the remote computer using the log system if the response datagram is the ICMP port unreachable datagram; and a protection module operable to drop the ICMP port unreachable datagram if the ICMP port unreachable datagram is abnormal, and record a port scan event of the remote computer into the log system.

8. The router according to claim 7, wherein the transferring module is further operable to transferring the response datagram to the remote computer if the response datagram is not the ICMP port unreachable datagram.

9. The router according to claim 7, wherein the protection module is further operable to drop the ICMP port unreachable datagram if the ICMP port unreachable datagram is normal.

10. The router according to claim 7, wherein the protection module is further operable to display the recorded port scan event on a display of the local computer.

11. The router according to claim 7, wherein the response datagram is determined to be the ICMP port unreachable datagram if an ICMP type of the datagram is 3 and an ICMP code of the datagram is 3.

12. The router according to claim 7, wherein the local computer is a local area network (LAN) server or a LAN station.

13. A non-transitory storage medium storing a set of instructions, the set of instructions capable of being executed by a processor to perform a method for preventing port scans using a router, the router being connected with a local computer, the router providing a log system to record connection logs of the local computer, the local computer comprising a user datagram protocol (UDP) port, the method comprising:

receiving a datagram from a remote computer by the router, and transferring the datagram to the local computer;

receiving a response datagram from the local computer;

determining if the response datagram is an Internet Control Messages Protocol (ICMP) port unreachable datagram according to a datagram format of the response datagram;

determining if the ICMP port unreachable datagram is normal according to connection logs between the local computer with the remote computer using the log system, if the response datagram is the ICMP port unreachable datagram; and dropping the ICMP port unreachable datagram if the ICMP port unreachable datagram is abnormal, and recording a port scan event of the remote computer into the log system.

14. The non-transitory storage medium as claimed in claim 13, wherein the method further comprises:

transferring the response datagram to the remote computer if the response datagram is not the ICMP port unreachable datagram.

15. The non-transitory storage medium as claimed in claim 13, wherein the method further comprises:

dropping the ICMP port unreachable datagram if the ICMP port unreachable datagram is normal.

16. The non-transitory storage medium as claimed in claim 13, wherein the method further comprises:

displaying the recorded port scan event on a display of the local computer.

17. The non-transitory storage medium as claimed in claim 13, wherein the response datagram is determined to be the ICMP port unreachable datagram if an ICMP type of the datagram is 3 and an ICMP code of the datagram is 3.

18. The non-transitory storage medium as claimed in claim 13, wherein the local computer is a local area network (LAN) server or a LAN station.

* * * * *